(12) United States Patent
Kim

(10) Patent No.: US 8,526,140 B2
(45) Date of Patent: Sep. 3, 2013

(54) REVERSE FLOW PREVENTER UNIT

(75) Inventor: Hyun Ki Kim, Seoul (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/435,684

(22) Filed: Mar. 30, 2012

(65) Prior Publication Data
US 2012/0250190 A1  Oct. 4, 2012

(30) Foreign Application Priority Data

Mar. 30, 2011 (KR) .................. 10-2011-0029046

(51) Int. Cl.
*G11B 17/32*  (2006.01)

(52) U.S. Cl.
USPC ..................................... 360/235.7

(58) Field of Classification Search
USPC .......... 360/235.7, 235.8, 235.6, 235.1, 235.5, 360/236.3, 236.2, 236.1, 236.5
See application file for complete search history.

(56) References Cited

U.S. PATENT DOCUMENTS

| 4,814,906 A * | 3/1989 | Suzuki et al. ............. 360/75 |
| 6,125,004 A * | 9/2000 | Katase et al. ............. 360/234.3 |
| 6,339,517 B1 | 1/2002 | Cheong |
| 6,344,949 B1 * | 2/2002 | Albrecht et al. ........... 360/236.5 |
| 7,394,623 B2 * | 7/2008 | Song ...................... 360/235.5 |
| 7,502,202 B2 | 3/2009 | Takahashi |
| 7,855,854 B2 * | 12/2010 | Hu et al. ................. 360/235.7 |
| 7,894,162 B2 * | 2/2011 | Mahdev et al. ........... 360/236.5 |
| 7,961,433 B2 | 6/2011 | Zheng et al. |
| 8,300,360 B2 * | 10/2012 | Bandic et al. ............. 360/235.4 |
| 2002/0145827 A1 * | 10/2002 | Bunch et al. ............. 360/235.1 |
| 2004/0130822 A1 * | 7/2004 | Payne et al. ............. 360/236.3 |
| 2008/0158716 A1 | 7/2008 | Kubotera et al. |
| 2010/0149692 A1 | 6/2010 | Fujimaki et al. |
| 2010/0238592 A1 | 9/2010 | Mizutani |

FOREIGN PATENT DOCUMENTS

| KR | 2004077058 A | 9/2004 |
| KR | 10-2007-0103878 A | 10/2007 |

* cited by examiner

*Primary Examiner* — Allen T Cao

(74) *Attorney, Agent, or Firm* — Leanne Taveggia Farrell; Westman, Champlin & Kelly, P.A.

(57) ABSTRACT

Disclosed are a slider for a memory device and a memory device having the same. The slider for a memory device includes a slider body configured to fly over the surface of a medium at a particular height; and a reverse flow preventing unit disposed at part of the slider body adjacent to a trailing edge of the slider body and configured to prevent a reverse flow of air between the medium and the slider body.

18 Claims, 4 Drawing Sheets

REVERSE FLOW PREVENTER UNIT

CROSS-REFERENCE TO RELATED APPLICATIONS

This application claims the benefit of Korean Patent Application No. 10-2011-0029046, filed with the Korean Intellectual Property Office on Mar. 30, 2011, the disclosure of which is incorporated herein by reference in its entirety.

FIELD OF THE DISCLOSURE

Embodiments of the present disclosure relate to a slider for a hard disc drive (HDD) and an HDD having the same, and particularly, to a slider for an HDD capable of preventing a reverse flow of air occurring along an Air Bearing Surface (ABS) of the slider, and an HDD having the same.

BACKGROUND OF THE DISCLOSURE

A hard disc drive (HDD) is a device to reproduce data recorded on a disc or records data onto the disc using a read/write head. The hard disc drive is being widely used as an auxiliary memory device of a computer system owing to its capability to access a great amount of data at a high speed.

Recently, the HDD has high capability owing to its increased Tracks Per Inch (TPI) and Bits Per Inch (BPI). As the HDD has high capability, the read/write head has a smaller size and a gap between a slider flying above the surface of a disc and the disc becomes narrower.

Especially, in the case of an HDD applying Thermal Fly height Control (TFC) technique, the slider and the disc maintains a gap of 1-5 nanometers (nm) therebetween.

However, if the slider flies while maintaining a smaller gap from the disc, lubricant on the surface of the disc may be transferred to the slider due to a reverse flow of air.

FIG. 1 is a view showing a lubricant transfer phenomenon occurring on a slider of a hard disc drive (HDD) in accordance with the related art, and FIG. 2 is a view showing an air flow inside the slider of FIG. 1.

As shown, when the disc 200 rotates, air 202 is introduced into space between the disc and the slider 204 along a rotation direction of the disc 200, thereby flying the slider 204. The air has deceased pressure at a trailing edge (TE) thereof. As a result, a reverse flow of the air 206 occurs along the TE and an Air Bearing Surface (ABS).

The reverse flow transfers lubricant 208 which is on the surface of the disc 200 to the slider. This may cause the lubricant to be accumulated on the slider or the disc, and cause a difficulty in maintaining the gap between the slider and the disc. As a result, the HDD may not smoothly operate.

In the related art, the reverse flow is prevented by changing a shape of the slider, or by forming a lube dam on the ABS.

However, the related method may have the following problems. That is, the slider has a restricted shape, and flying performance of the slider on the ABS is lowered.

The discussion above is merely provided for general background information and is not intended to be used as an aid in determining the scope of the claimed subject matter.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Therefore, an aspect of the disclosure embodiments is to provide a slider for a hard disc drive (HDD) capable of preventing a reverse flow of air between the slider and a disc, and an HDD having the same.

To achieve these and other advantages as embodied and broadly described herein, there is provided a slider for a hard disc drive (HDD), the slider comprising: a slider body having a read/write head mounted thereon, the read/write head for recording data on a disc or reading out data on the disc while flying over the surface of the disc at a particular height; and a reverse flow preventing unit disposed at part of the slider body adjacent to the read/write head, and configured to prevent a reverse flow of air between the disc and the slider body.

The reverse flow preventing unit may include at least one through hole penetratingly formed at part of the slider body, such that external air is mixed with air flowing between the slider body and the disc.

The through hole may include an inlet through which external air is introduced, and an outlet through which the external air is exhausted out.

The inlet may be formed on an upper surface of the slider body.

The outlet may be formed on a front surface of a trailing edge of the slider body, which is close to the read/write head.

The inlet may have a diameter larger than that of the outlet.

The through hole may be inclined.

The slider may further comprise a stepped portion protruding from the slider body in a stair-step shape, on the front surface of the trailing edge of the slider body adjacent to the read/write head, and configured to prevent collision between the slider body and the disc, and to maintain a small gap between the read/write head and the disc.

The reverse flow preventing unit may include a through hole penetratingly formed at part of the slider body. The through hole may include an inlet through which external air is introduced, and an outlet through which the external air is exhausted out. The outlet may be penetratingly formed at the slider body below the stepped portion.

The inlet may be formed on an upper surface of the slider body.

To achieve these and other advantages as embodied and broadly described herein, there is also provided a hard disc drive (HDD) comprising: a disc on which data is recorded and read out; and a slider including a slider body and a reverse flow preventing unit, the slider body having a read/write head mounted thereon, the read/write head for recording data onto the disc or reading out data on the disc while flying above the surface of the disc at a particular height, the reverse flow preventing unit disposed at part of the slider body adjacent to the read/write head and configured to prevent a reverse flow of air between the disc and the slider body.

The reverse flow preventing unit may include at least one through hole penetratingly formed at part of the slider body, such that external air is mixed with air flowing between the slider body and the disc.

The through hole may include an inlet through which external air is introduced, and an outlet through which the external air is exhausted out.

The inlet may be formed on an upper surface of the slider body.

The outlet may be formed on a front surface of a trailing edge of the slider body, which is close to the read/write head.

The inlet may have a diameter larger than that of the outlet.

The through hole may be inclined.

The HDD may further comprise a stepped portion protruding from the slider body in a stair-step shape, on the front surface of the trailing edge of the slider body adjacent to the read/write head, and configured to prevent collision between the slider body and the disc, and to maintain a small gap between the read/write head and the disc.

The reverse flow preventing unit may include a through hole penetratingly formed at part of the slider body. The through hole may include an inlet through which external air is introduced, and an outlet through which the external air is exhausted out. The outlet may be penetratingly formed at the slider body below the stepped portion.

The inlet may be formed on an upper surface of the slider body.

In the present disclosure, owing to the reverse flow preventing unit formed at the slider, a reverse flow of air between the slider and the disc may be prevented.

Further scope of applicability of the present application will become more apparent from the detailed description given hereinafter. However, it should be understood that the detailed description and specific examples, while indicating some embodiments of the disclosure, are given by way of illustration only, since various changes and modifications within the scope of the disclosure will become apparent to those skilled in the art from the detailed description.

DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION

Description will now be given in detail of the exemplary embodiments, with reference to the accompanying drawings. For the sake of brevity with reference to the drawings, the same or equivalent components will be provided with the same reference numbers, and a detailed description thereof will not be repeated.

Figure 1:
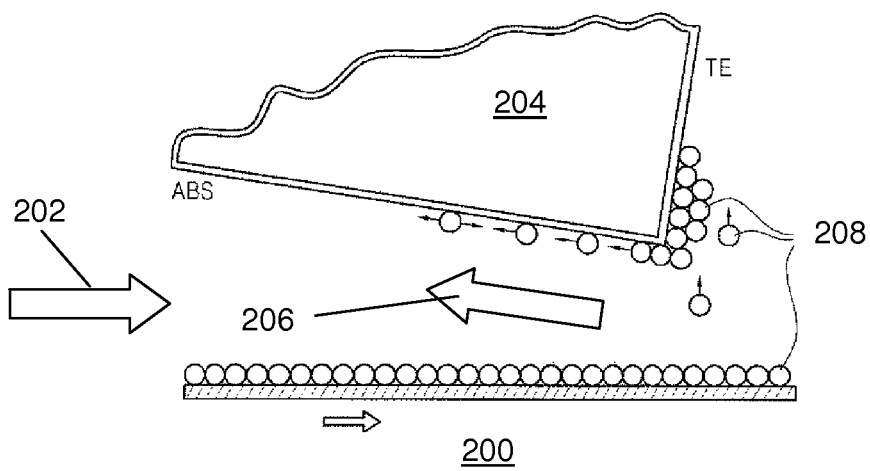
FIG. 1 is a view showing a lubricant transfer phenomenon occurring on a slider of a hard disc drive (HDD) in accordance with the related art.
Figure 2:
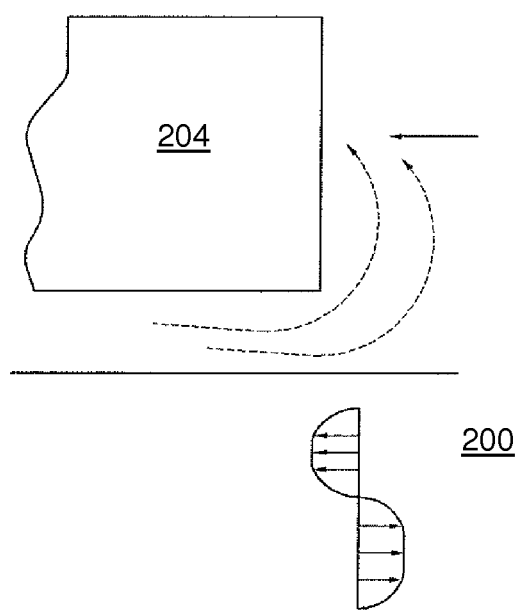
FIG. 2 is a view showing an air flow inside the slider of FIG. 1.
Figure 3:
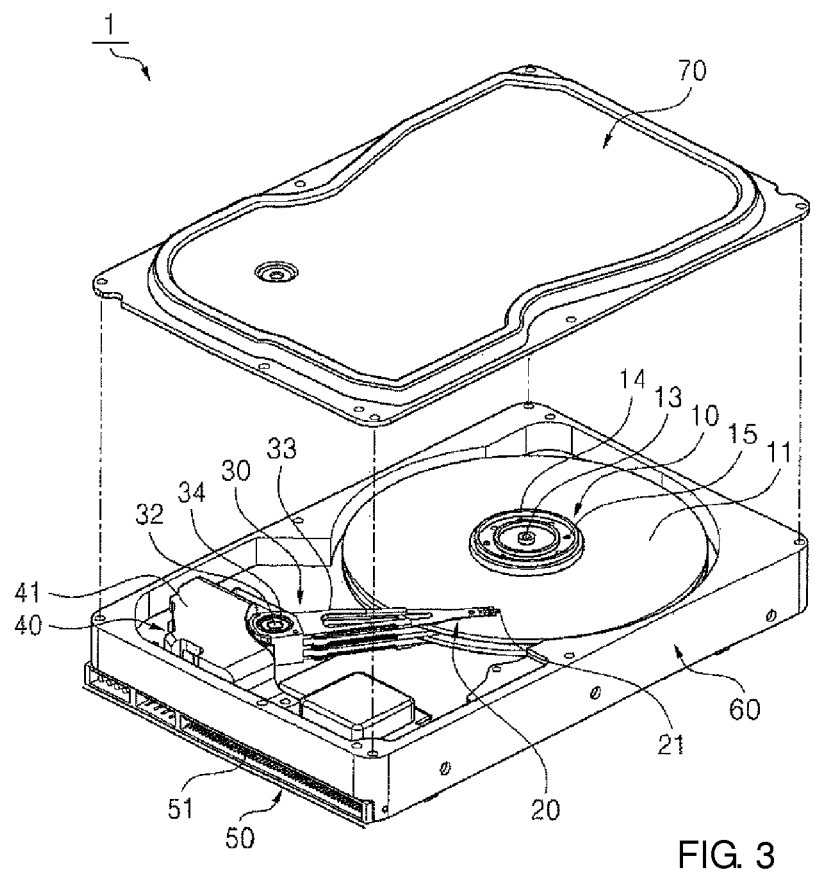
FIG. 3 is a partial disassembled perspective view of an HDD according to a first embodiment of the present disclosure.

FIG. 3 is a partial disassembled perspective view of an HDD according to a first embodiment of the present disclosure.

Referring to FIG. 3, a hard disc drive (HDD) 1 according to a first embodiment of the present disclosure comprises a disc pack 10 having at least one disc 11 onto which data is recorded, a Head Stack Assembly (HSA) 30 including a Head Gimbal Assembly (HGA) 20 having a read/write head 21 mounted thereon, the read/write head 21 for recording data onto the disc 11 or reading out data on the disc 11, a voice coil motor (VCM) 40, a Printed Circuit Board Assembly (PCBA) 50, a base 60 onto which the components are assembled, and a cover 70 for covering the base 60.

The disc pack 10 is an assembly of media onto which data is recorded, which is implemented by fixing a plurality of circular discs 11 to the same shaft. In this embodiment, the disc pack 10 includes a plurality of circular discs 11, a shaft 13 serving as a pivoting center, a spindle motor hub (not shown) rotating together with the disc 11 and supporting the disc 11, a spindle motor (not shown) for rotating the spindle motor hub, a clamp 14 coupled to an upper part of the spindle motor hub, and a clamp screw 15 for pressing the clamp 14 so that the disc 11 can be fixed to the spindle motor hub. Under this configuration, the disc 11 can rotate to generate a force to fly the read/write head 21 above the surface of the disc 11.

The Printed Circuit Board Assembly (PCBA) 50 includes a Printed Circuit Board (PCB, not shown) coupled to a rear surface of the base 60, a Flexible Printed Circuit Board (FPCB) mounted to an upper surface of the base 60 close to the HSA 30, and configured to electrically connect the HSA 30 and the PCB with each other, and a PCB connector 51 disposed at one side of the PCB. A plurality of chips (not shown) configured to control the disc packs 10, the HSA 30, the VCM 40, etc. are mounted to the PCB. The PCB transmits and receives signals to/from the outside through the PCB connector 51.

The VCM 40 is a type of driving motor for driving an actuator arm 33 of the HSA 30 in a particular direction, so that the read/write head 21 can be moved to a desired position on the disc 11. The VCM 41 includes a VCM block 41 having a magnet (not shown), and a VCM coil (not shown) mounted to a bobbin (not shown).

The VCM 40 is operated according to Fleming's left-hand rule, whereby an electromagnetic force is generated when current flows in a conductive body existing in a magnetic field. More specifically, the VCM 40 pivots a bobbin upon applying a force to the bobbin by applying current to a VCM coil located between magnets. Under this configuration, the actuator arm 33 rotates in a particular direction, and the read/write head 21 mounted to the end of the actuator arm 33 moves on the rotating disc 11 in a radius direction. The read/write head 21 searches one or more tracks while moving on the disc 11 and accesses information, thereby recording data onto the disc 11 or reading out data on the disc 11.

The HSA 30 includes a Head Gimbal Assembly (HGA) 20 having the read/write head 21 mounted thereon, the read/write head 21 for recording data onto the disc 11 or reading out data on the disc 11, an actuator arm 33 which moves or pivots with respect to the disc 11 around a pivot shaft 32 as a pivoting center so that the read/write head 21 may access data on the disc 11, a pivot shaft holder 34 for rotatably supporting the pivot shaft 32, and to which the actuator arm 33 is coupled for support, and a bobbin (not shown) disposed at the pivot shaft holder 34 in the opposite direction to the actuator arm 33, and on which a voice coil motor (VCM) coil (not shown) is wound so as to be located between magnets (not shown) of the VCM 40.

Figure 4:
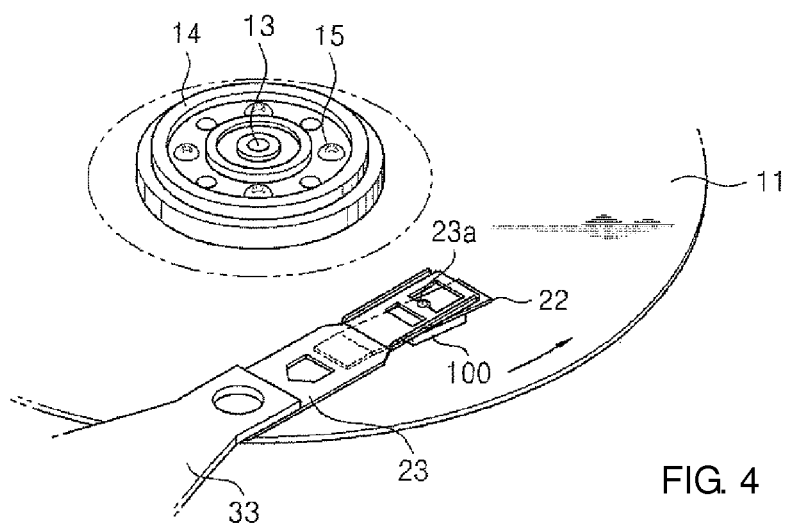
FIG. 4 is an enlarged perspective view of a Head Gimbal Assembly (HGA) of FIG. 3.
Figure 5:
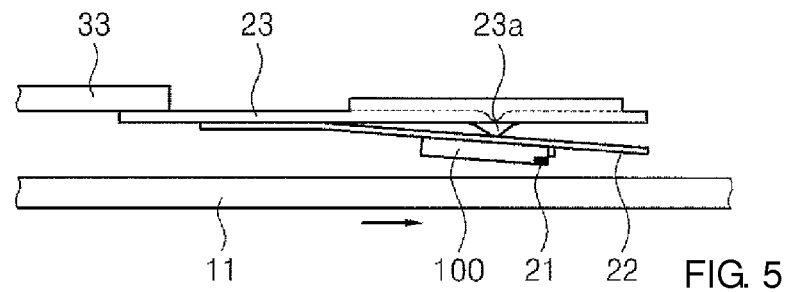
FIG. 5 is a side sectional view of FIG. 4.

FIG. 4 is an enlarged perspective view of a Head Gimbal Assembly (HGA) of FIG. 3, and FIG. 5 is a side sectional view of FIG. 4.

Referring to FIGS. 4 and 5, the Head Gimbal Assembly (HGA) 20 includes the read/write head 21 for recording data onto the disc 11 or reading out data on the disc 11, a slider 100 having the read/write head 21 mounted thereon, a flexure 22 to which the slider 100 is coupled, and a suspension 23 coupled to one end of the actuator arm 33.

The read/write head 21 is provided on a bottom surface of the slider 100, and records data onto the disc 11 or reads out data on the disc 11 by sensing a magnetic field generated on the surface of the disc 11, or by magnetizing the surface of the disc 11. The read/write head 21 includes a write head for magnetizing the disc 11, and a read head for sensing a magnetic field of the disc 11.

The flexure 22, part to which the slider 100 is coupled, has a rear end portion coupled to one surface of the suspension 23, i.e., a surface facing the disc 11. To a front end portion of the flexure 22, the slider 100 having the read/write head 21 mounted thereon is coupled. In order to restrict an up-down moving distance of the flexure 22, a dimple 23a and a limiter (not shown) are provided at the suspension 23.

The dimple 23a is configured to restrict a spaced distance of the slider 100 from the disc 11, thereby preventing lowering of reliability when recording data onto the disc 11 or reading out data on the disc 11 by the read/write head 21. And, the limiter (not shown) is configured to prevent excessive spacing of the flexure 22 from the suspension 23, thereby preventing interference between the read/write head 21 and the disc 11.

The suspension 23, part to which the flexure 22 is coupled, may allow the slider 100 to move close to or far from the surface of the disc 11 in an elastically biased manner.

Hereinafter, the slider 100 for an HDD according to a first embodiment of the present disclosure will be explained in more details.

Figure 6:
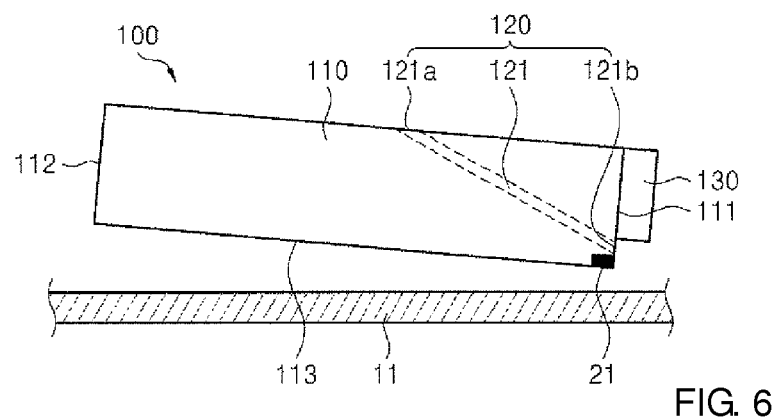
FIG. 6 is a schematic side sectional view of a slider and a disc for an HDD according to a first embodiment of the present disclosure.
Figure 7:
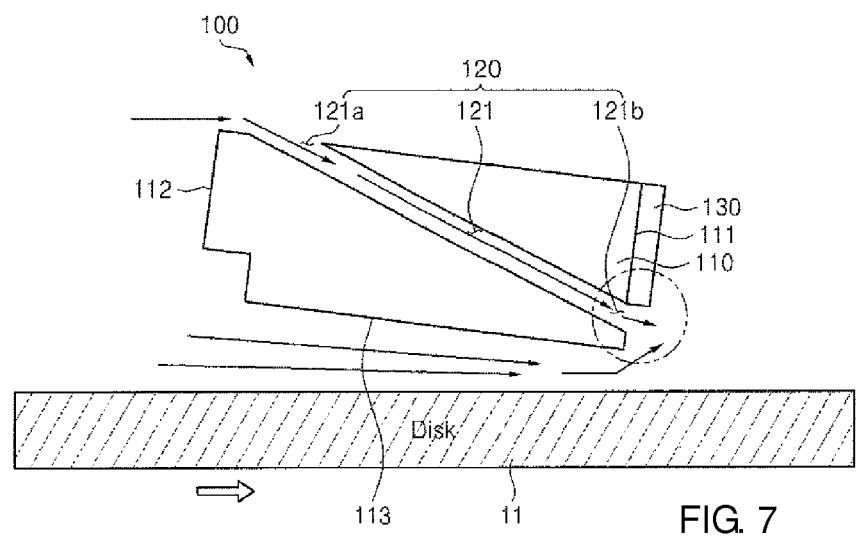
FIG. 7 is a view for explaining an air flow inside the slider of FIG. 6.
Figure 8:
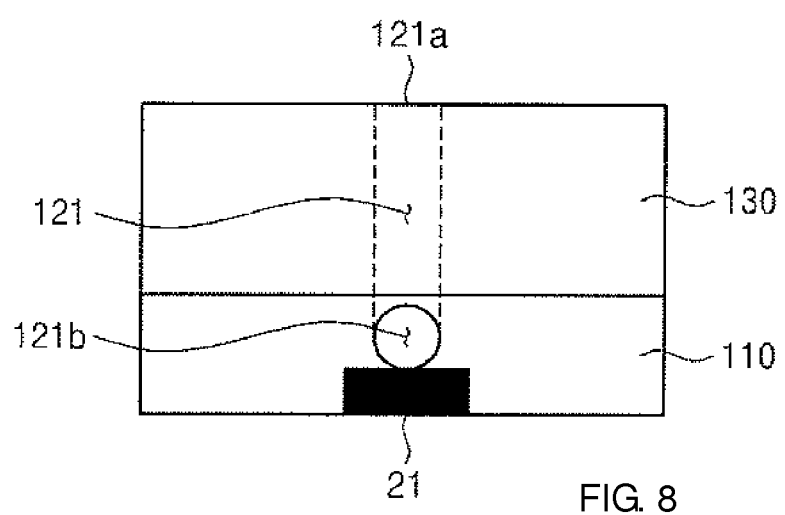
FIG. 8 is a frontal view of the slider of FIG. 7.

FIG. 6 is a schematic side sectional view of a slider and a disc for an HDD according to a first embodiment of the present disclosure, FIG. 7 is a view for explaining an air flow inside the slider of FIG. 6, and FIG. 8 is a frontal view of the slider of FIG. 7.

Referring to FIGS. 6 to 8, the slider 100 for an HDD according to a first embodiment includes a slider body 110 having a read/write head 21 mounted thereon, the read/write head 21 for recording data onto the disc 11 or reading out data on the disc 11 while flying above the surface of the disc 11 at a particular height, and a reverse flow preventing unit 120 disposed at part of the slider body 110 close to the read/write head 21 and configured to prevent a reverse flow of air between the disk 11 and the slider body 110.

The slider body 110 may be formed in a thin cube shape. A front surface of the slider body 110 in a rotation direction of the disc 11 is called 'Leading Edge' 112, whereas a rear surface of the slider body 110 where the read/write head 21 is mounted is called 'Trailing Edge' 111. A lower surface of the slider body 110 is called 'Air Bearing Surface' (ABS) 113, and may have various patterns for flying of the slider 100.

When the disc 11 rotates at a high speed, a force to fly the slider body 110 is generated due to friction between the surface of the disc 11 and air. The flying force allows the slider body 110 to fly in a state where the read/write head 21 is mounted thereto. As a result, as shown in FIG. 5, the read/write head 21 records data onto the disc 11 or reads out data on the disc 11 while maintaining the flying state above a data region of the disc 11, at a height where the flying force is balanced with an elastic force by the suspension 23.

The reverse flow preventing unit 120 includes a through hole 121 penetratingly formed at part of the slider body 110 so that external air can be mixed with air flowing between the slider body 110 and the disc 11.

Referring to FIGS. 6 to 8, the through hole 121 includes an inlet 121a through which external air is introduced, and an outlet through which the external air is exhausted out. More specifically, the inlet 121a is formed on an upper surface of the slider body 110, and through which external air above the slider body 110 is introduced into the through hole 121 of the reverse flow preventing unit 120. And, the outlet 121b is formed on a front surface of the trailing edge (TE) 111 of the slider body 110 where a reverse flow of air occurs, and through which the external air introduced into the through hole 121 via the inlet 121a is exhausted.

The inlet 121a of the through hole 121 is formed to have a diameter larger than that of the outlet 121b. This may increase an introduction amount of external air above the slider body 110, into the through hole 121 through the inlet 121a.

The through hole 121 is inclined between the inlet 121a and the outlet 121b so that introduced external air can smoothly move without any resistance.

The slider 100 for an HDD according to the present disclosure further includes a stepped portion 130 protruding from the slider body 110 in a stair-step shape, on the front surface of the trailing edge (TE) 111 of the slider body 110 close to the read/write head 21, and configured to prevent collision between the slider 100 and the disc 11 when the slider 100 has a constant pitch angle, and to maintain a small gap between the read/write head 21 and the disc 11.

The stepped portion 130 is formed as read/write sensors (not shown) of the read/write head 21 are laminated on each other, and is disposed on the front surface of the TE 111 of the slider body 110 close to the read/write head 21.

Under the configuration of this embodiment, air pressure is reduced below the stepped portion 130 stepped with respect to the slider body 110, causing a reverse flow of air. To prevent this, the outlet 121b of the through hole 121 is penetratingly formed at the slider body 110 below the stepped portion 130. As a result, a reverse flow of air occurring between the slider body 110 and the disc 11 can be prevented.

In this embodiment, when the HDD 1 operates, a reverse flow of air occurring between the slider body 110 and the disc 11 can be prevented. This can allow the read/write head 21 to maintain an optimum flying height.

In this embodiment, a single through hole 121 is penetratingly formed at the slider body 110. However, the present disclosure is not limited to this. That is, a plurality of through holes 121 may be formed to prevent a reverse flow of air occurring on the bottom surface of the slider body 110. For instance, the reverse flow preventing unit 120 may be implemented as two through holes 121.

In this embodiment, the inlet 121a of the through hole 121 is formed at an upper part of the slider body 110. However, the present disclosure is not limited to this. That is, the inlet 121a may be formed at any position where external air unrelated to generation of a flying force of the slider 100 can be introduced. For instance, the inlet 121a of the through hole 121 may be formed on a side surface of the slider body 110.

In this embodiment, the slider 100 includes the stepped portion 130. However, the present disclosure is not limited to this. That is, the reverse flow preventing unit 120 may be also applied to the slider 100 not having the stepped portion 130.

The foregoing embodiments and advantages are merely exemplary and are not to be construed as limiting the inventive concepts herein. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A slider comprising:
a slider body configured to fly over the surface of a medium at a particular height; and
a reverse flow preventing unit disposed at part of the slider body adjacent to the trailing edge of the slider body, and configured to prevent a reverse flow of air between the medium and the slider body;
wherein the reverse flow preventing unit includes at least one through hole penetratingly formed at part of the slider body such that external air is mixed with air flowing between the slider body and the medium.

2. The slider of claim 1, wherein the through hole includes:
an inlet through which external air is introduced; and
an outlet through which the external air is exhausted out.

3. The slider of claim 2, wherein the inlet is formed on an upper surface of the slider body.

4. The slider of claim 2, wherein the outlet is formed on a front surface of the trailing edge of the slider body adjacent to a read/write head mounted on the slider body.

5. The slider of claim 2, wherein the inlet has a diameter larger than that of the outlet.

6. The slider of claim 1, wherein the through hole is formed to be inclined.

7. The slider of claim 1, further comprising a stepped portion protruding from the slider body in a stair-step shape, on the front surface of the trailing edge of the slider body adjacent to a read/write head mounted to the slider body, and configured to prevent collision between the slider body and the medium and to maintain a small gap between the read/write head and the medium.

8. The slider of claim 7, wherein the through hole includes:
an inlet through which external air is introduced; and
an outlet through which the external air is exhausted out, and
wherein the outlet is penetratingly formed at the slider body below the stepped portion.

9. The slider of claim 8, wherein the inlet is formed on an upper surface of the slider body.

10. A memory device comprising:
a medium on which data is recorded and read out; and
a slider including a slider body having a read/write head mounted thereon, the read/write head for recording data onto the medium or reading out data on the medium, the slider body including at least one through hole that prevents a reverse flow of air between the medium and the slider body by mixing external air with air flowing between the slider body and the medium.

11. The memory device of claim 10, wherein the through hole includes:
an inlet through which external air is introduced; and
an outlet through which the external air is exhausted out.

12. The memory device of claim 11, wherein the inlet is formed on an upper surface of the slider body.

13. The memory device of claim 11, wherein the outlet is formed on a front surface of a trailing edge of the slider body, which is close to the read/write head.

14. The memory device of claim 11, wherein the inlet has a diameter larger than that of the outlet.

15. The memory device of claim 10, wherein the at least one through hole is inclined.

16. The memory device claim 10, further comprising a stepped portion protruding from the slider body in a stair-step shape, on the front surface of the trailing edge of the slider body adjacent to the read/write head, and the stepped portion configured to prevent collision between the slider body and the medium, and to maintain a small gap between the read/write head and the medium.

17. The memory device of claim 16, wherein the through hole includes:
an inlet through which external air is introduced; and
an outlet through which the external air is exhausted out, and
wherein the outlet is penetratingly formed at the slider body below the stepped portion.

18. The memory device of claim 17, wherein the inlet is formed on an upper surface of the slider body.

* * * * *